(12) United States Patent
Pruet et al.

(10) Patent No.: US 6,531,691 B1
(45) Date of Patent: Mar. 11, 2003

(54) METHOD AND SYSTEM FOR OPTICALLY TESTING A DETECTOR

(75) Inventors: James D. Pruet, Garland; Kerry A. Wilson, Royse City, both of TX (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/464,664

(22) Filed: Dec. 15, 1999

(51) Int. Cl.[7] .............................. H01J 5/16; G01D 5/34; G01J 1/42
(52) U.S. Cl. ..................... 250/216; 250/229; 356/225
(58) Field of Search ................................ 250/229, 216; 356/218, 213, 225; 73/1.42, 1.56; 324/414

(56) References Cited

U.S. PATENT DOCUMENTS

| | | | | |
|---|---|---|---|---|
| 2,601,182 A | * | 6/1952 | Tyler ........................... 356/321 |
| 4,131,367 A | * | 12/1978 | French et al. ................ 356/405 |
| 4,173,777 A | * | 11/1979 | Schmit et al. ............... 362/253 |
| 4,797,619 A | * | 1/1989 | Austin et al. ................ 324/409 |
| 5,453,829 A | * | 9/1995 | Remer et al. ................ 356/218 |
| 5,861,944 A | * | 1/1999 | Nishi ........................... 355/68 |

\* cited by examiner

*Primary Examiner*—Stephone Allen
*Assistant Examiner*—Eric Spears
(74) *Attorney, Agent, or Firm*—Baker Botts L.L.P.

(57) ABSTRACT

An optical test system (10) for testing one or more detectors includes a signal generator (12) operable to generate an optical signal. The test system (10) also includes an aperture system (16) operable to regulate an intensity of the optical signal. The test system (10) further includes a signal distributor (20) coupled to the aperture system (16) and operable to distribute the optical signal to a plurality of optical connections (22). Each optical connection (22) is coupled to a detector.

25 Claims, 5 Drawing Sheets

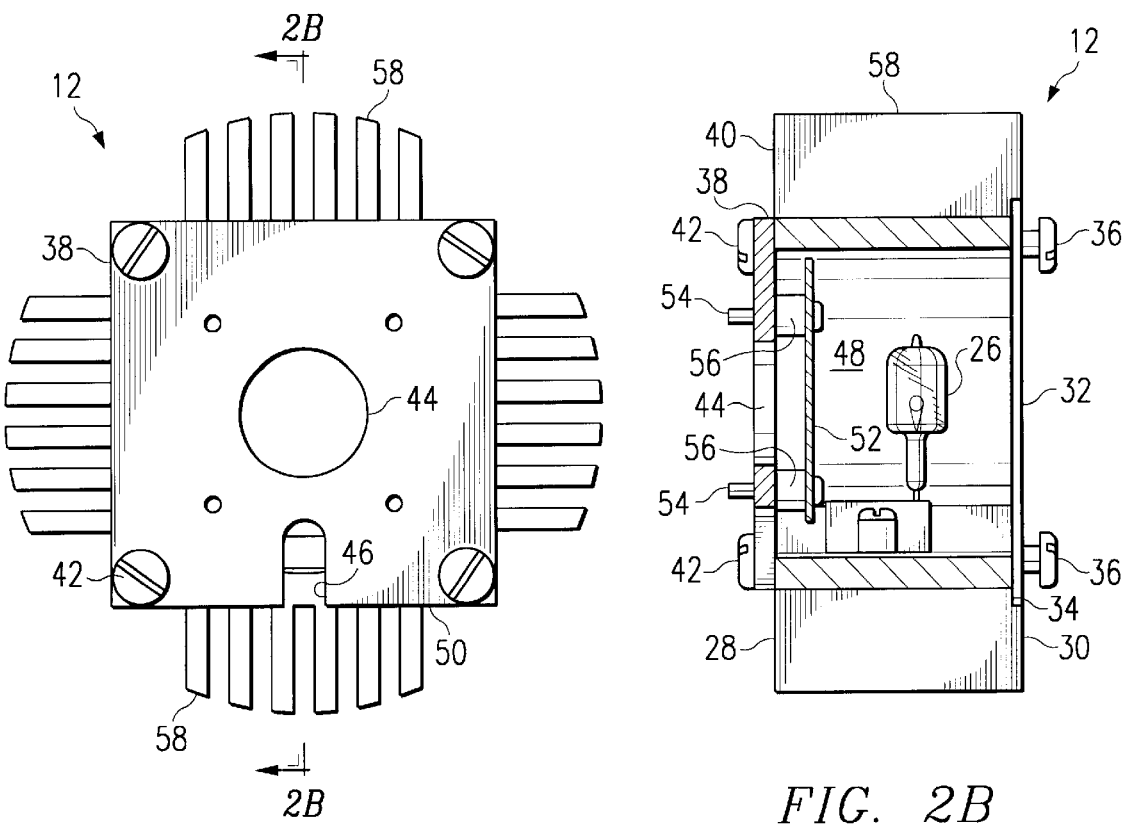
FIG. 2A
FIG. 2B
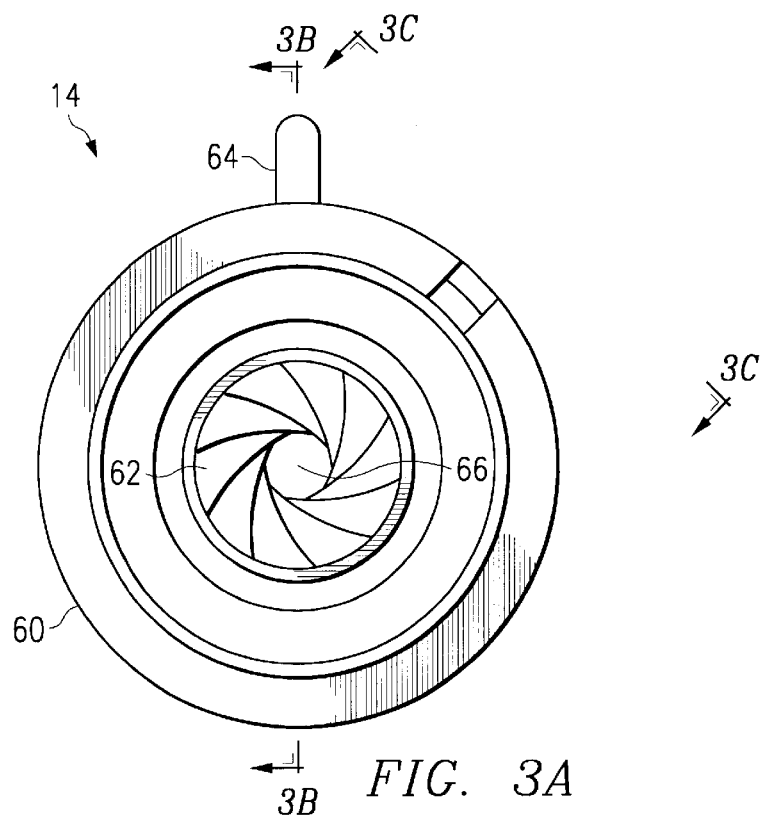
FIG. 3A

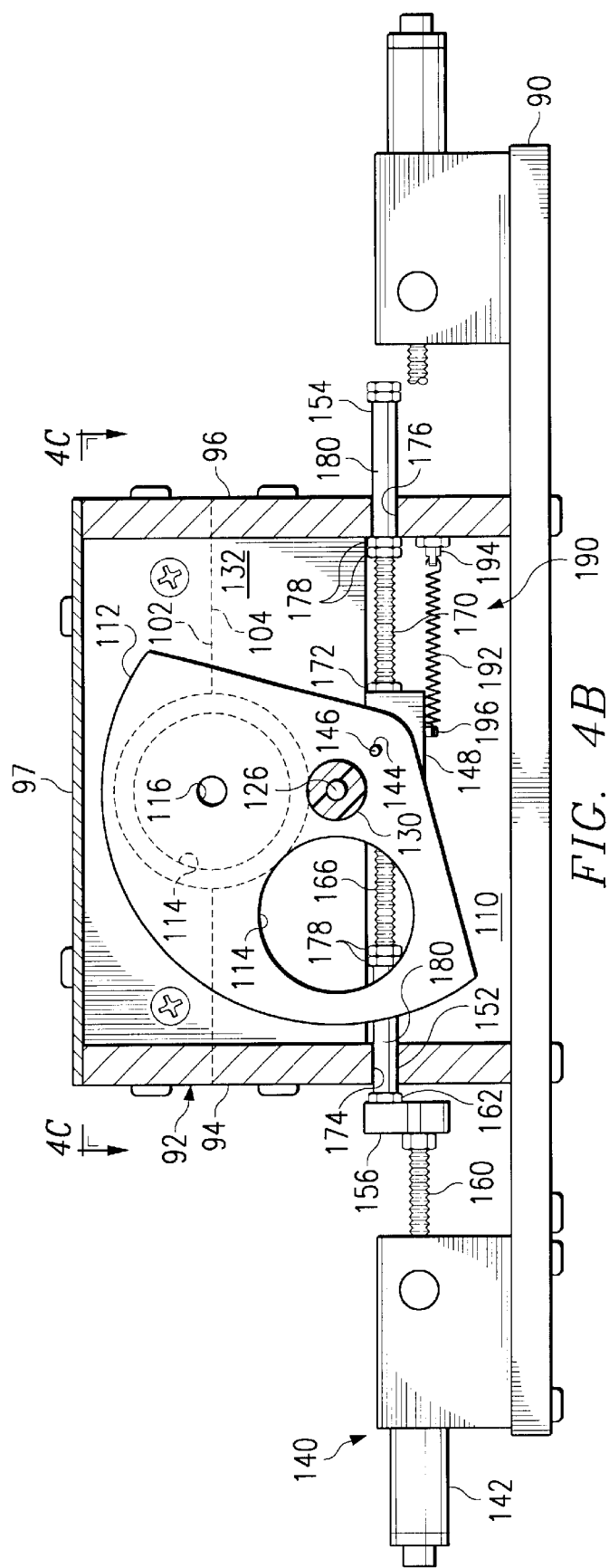
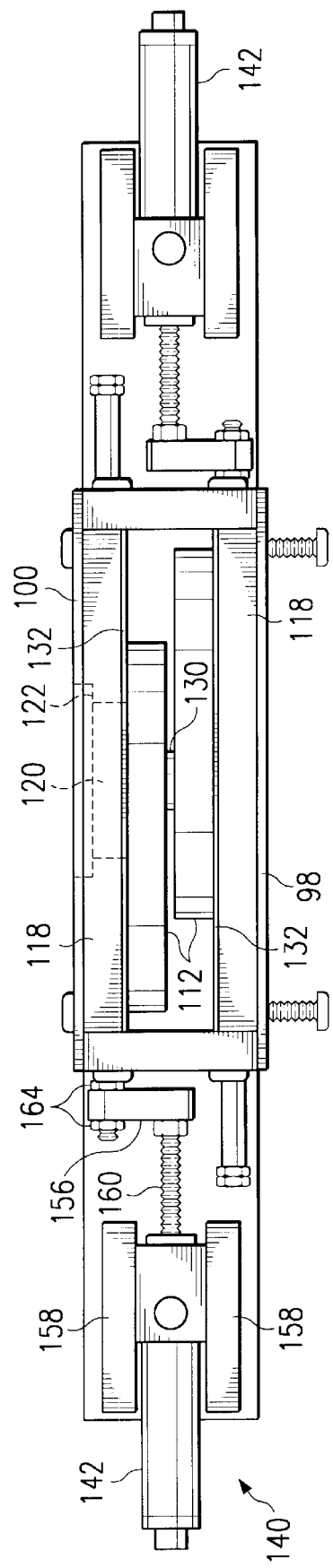
FIG. 4B
FIG. 4C

METHOD AND SYSTEM FOR OPTICALLY TESTING A DETECTOR

TECHNICAL FIELD OF THE INVENTION

This invention relates in general to the field of electro-optics and, more particularly, to a method and system for testing an optical detector.

BACKGROUND OF THE INVENTION

There are numerous methods and systems for detecting radiation. In one type of detector, photocathodes are used in conjunction with microchannel plates (MCPs) to detect low levels of electromagnetic radiation. Photocathodes emit electrons in response to exposure to photons. The electrons may then be accelerated by electrostatic fields toward a microchannel plate. A microchannel plate is typically manufactured from lead glass and has a multitude of channels, each one operable to produce cascades of secondary electrons in response to incident electrons. A receiving device then receives the secondary electrons and sends out a signal responsive to the electrons. Since the number of electrons emitted from the microchannel plate is much larger than the number of incident electrons, the signal produced by the device is stronger than it would have been without the microchannel plate.

One example of the use of a photocathode with a microchannel plate is an image intensifier tube. The image intensifier tube is used in night vision devices to amplify low light levels so that the user can see even in very dark conditions. In the image intensifier tube, a photocathode produces electrons in response to photons from an image. The electrons are then accelerated to the microchannel plate, which produces secondary emission electrons in response. The secondary emission electrons are received at a phosphor screen or, alternatively, a charge coupled device (CCD), thus producing a representation of the original image.

Another example of a device that uses a photocathode with a microchannel plate is a scintillation counter used to detect particles. High-energy particles pass through a scintillating material, thereby generating photons. Depending on the type of material used and the energy of the particles, these photons can be small in number. A photocathode in conjunction with a microchannel plate can be used to amplify the photon signal in similar fashion to an image intensifier tube. The detector can thus be used to detect faint particle signals and to transmit a signal to a device, e.g., a counter, that records the particle's presence.

An optical testing system is generally used to test the detectors to ensure compliance with various operating specifications and requirements. An example optical testing system may include a cylinder coupled to a detector. One or more light bulbs may be inserted into the cylinder at various longitudinal positions along the cylinder to provide a light source for the system. For example, three light bulbs may each be inserted into the cylinder at a different longitudinal position along the cylinder. A plate configured with an aperture may also be positioned adjacent each bulb between the bulb and the detector. In operation, each of the three bulbs may be illuminated individually or in combination with other bulbs to generate up to three light intensity levels for testing the detector.

Prior systems and methods for testing a detector suffer several disadvantages. For example, testing efficiency may require the operation of several optical testing systems simultaneously, thereby allowing the testing of multiple detectors during a single test session. However, operating and/or illuminating the quantity of light bulbs required to produce various light intensity levels may be expensive and difficult to maintain. The quantity of light bulbs used to supply the various light intensity levels may also be cost prohibitive.

Additionally, simultaneously operating multiple optical test systems to test multiple detectors may require repeating various test session parameters for various detectors. For example, one or more light bulbs positioned in a cylinder of one optical test system may fail during a test session. Accordingly, the optical test system having the light bulb failure may not be capable of providing the required light intensity levels during the test session. Although the test session may continue for other optical test systems and corresponding detectors, the detector coupled to the failed optical test system may require repeating the test session to complete the required testing parameters.

SUMMARY OF THE INVENTION

Accordingly, a need has arisen for a better technique having greater flexibility and control for testing optical detectors. In accordance with the present invention, an optical testing system and method for testing optical detectors is provided that substantially eliminates or reduces disadvantages and problems associated with previously developed systems and methods.

According to one embodiment of the present invention, an optical test system for testing one or more detectors includes a signal generator operable to generate an optical signal. The system also includes an aperture system operable to regulate an intensity of the optical signal. The system further includes a signal distributor coupled to the aperture system and operable to distribute the optical signal to a plurality of optical connections. Each optical connection is coupled to a detector.

According to another embodiment of the present invention, a method for testing one or more optical detectors includes generating an optical signal using a signal generator. The method also includes regulating an intensity of the optical signal using an aperture system. The method further includes distributing the optical signal to one or more optical connections. Each optical connection is coupled to a detector.

The technical advantages of the present invention include an optical detector testing system that provides greater flexibility and reliability for testing multiple optical detectors than prior systems and methods. For example, according to one aspect of the present invention, an optical signal is generated from a signal generator and is distributed to one or more optical detectors. If the signal generator requires replacement during a testing session, the testing session may be temporarily suspended during replacement of the signal generator. Once the signal generator has been replaced, the testing session may continue. Thus, each detector that is tested using the present invention experiences a substantially complete testing session, thereby substantially eliminating a requirement of repeating the testing session for various detectors.

Additionally, the present invention provides greater flexibility than prior systems and methods by providing one or more optical signal intensity levels using a single optical signal generator. For example, according to one aspect of the present invention, an aperture system includes a plurality of shutters. Each shutter includes one or more apertures of different sizes. Various apertures of each shutter may be aligned to provide the desired optical signal intensity.

BRIEF DESCRIPTION OF THE DRAWINGS

For a more complete understanding of the present invention, and the advantages thereof, reference is now made to the following descriptions taken in connection with the accompanying drawings, in which:

FIGS. 2A and 2B are diagrams illustrating an optical signal generator of the system illustrated in FIG. 1 in accordance with an embodiment of the present invention;

FIGS. 3A, 3B and 3C are diagrams illustrating an iris system of the system illustrated in FIG. 1 in accordance with an embodiment of the present invention;

FIGS. 4A, 4B and 4C are diagrams illustrating an aperture system of the system illustrated in FIG. 1 in accordance with an embodiment of the present invention.

DETAILED DESCRIPTION OF THE INVENTION

Embodiments of the present invention and the advantages thereof are best understood by referring to the following description and drawings, wherein like numerals are used for like and corresponding parts of the various drawings.

Figure 1:
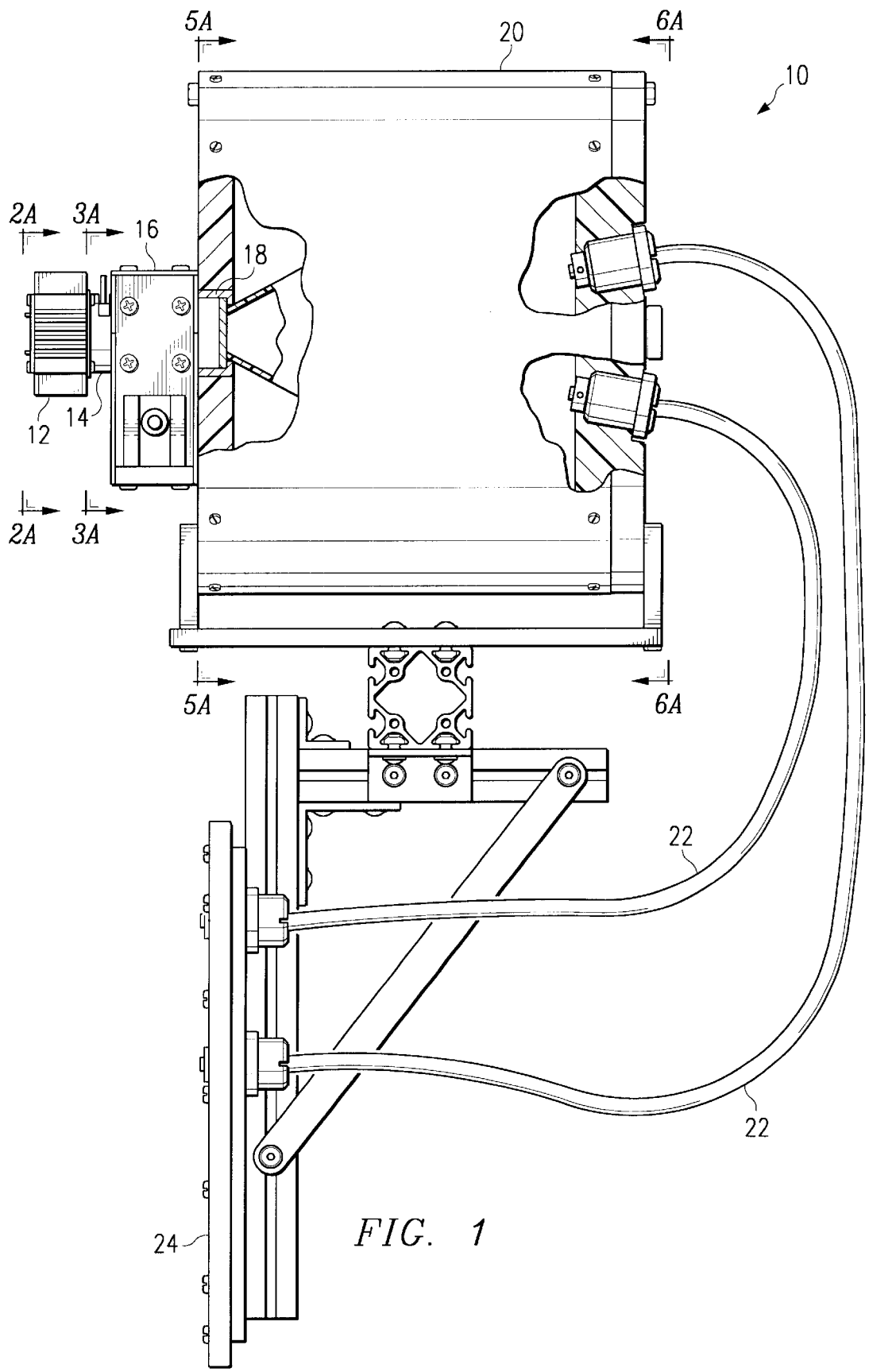
FIG. 1 is diagram illustrating an optical testing system in accordance with an embodiment of the present invention.

FIG. 1 is a diagram illustrating an optical testing system 10 in accordance with an embodiment of the present invention. System 10 comprises an optical signal generator 12, an iris system 14, an aperture system 16, a filter system 18, and an optical signal distributor 20. System 10 also comprises one or more optical connections 22 coupled between optical signal distributor 20 and one or more interfaces 24. Optical connections 22 may comprise liquid light guides or other suitable optical transmitting media. One or more optical detectors (not explicitly shown) may be coupled to each interface 24 for testing the optical detectors using system 10.

Briefly, optical signal generator 12 generates an optical signal to be used for testing the optical detectors coupled to each interface 24. The optical signal is transmitted through iris system 14 to aperture system 16. Iris system 14 and aperture 16 may be used to regulate an amplitude or intensity of the optical signal to accommodate various optical testing requirements. The optical signal is transmitted from aperture system 16 through filter system 18 to optical signal distributor 20. In operation, optical signal distributor 20 receives the optical signal and distributes the optical signal to each optical connection 22. The optical signal is then transmitted through optical connections 22 to each optical detector.

FIG. 2A is a diagram illustrating optical signal generator 12 in accordance with an embodiment of the present invention taken along the line 2A—2A of FIG. 1, and FIG. 2B is a section diagram illustrating optical signal generator 12 illustrated in FIG. 2A. Optical signal generator 12 comprises an optical source 26 disposed within a housing 28. Optical source 26 may comprise a lamp or bulb, such as a halogen bulb, to produce light or optical signals; however, other suitable methods or devices may be used to generate optical signals. Housing 28 comprises an end 30 having an opening 32 for emitting the optical signals generated by optical source 26. End 30 of housing 28 may also comprise a recessed portion 34 configured to receive iris system 14. For example, a portion of iris system 14 may be disposed within recessed portion 34 of housing 28 and secured to housing 28 using fasteners 36. However, other suitable methods or devices may be used to secure iris system 14 to housing 28.

Optical signal generator 12 also comprises a cover 38 secured to an end 40 of housing 28. Cover 38 may be removably secured to end 40 of housing 28 using fasteners 42; however, other suitable methods or devices may be used to secure cover 38 to housing 28. Cover 38 comprises an opening 44 to provide dissipation of thermal energy generated by optical source 26. Cover 38 may also comprise a recessed portion 46 to provide access to an internal area 48 of housing 28 for communicating electrical or other types of connections to optical source 26. For example, recessed portion 46 may comprise a slot or notch disposed along an edge 50 of cover 38; however, other suitable configurations may be used to provide access to internal area 48 of housing 28.

Optical signal generator 12 may also comprise a reflector 52 to reflect optical signals generated by optical source 26 toward opening 34. Reflector 52 may also be used to prevent interference of optical signals generated by optical source 26 from external light or optical sources. For example, reflector 52 may be disposed within internal area 48 of housing 28 between optical source 26 and opening 44 of cover 38. Thus, reflector 52 may be used to prevent external optical signals entering through opening 44 from interfering with optical signals generated by optical source 26.

Reflector 52 may be coupled to cover 38 using fasteners 54. However, other suitable methods or devices may be used to secure reflector 52 within internal area 48 of housing 28. Additionally, reflector 52 may be used to absorb and dissipate thermal energy generated by optical source 26. For example, reflector 52 may be disposed within internal area 48 of housing 28 such that one or more spacers 56 are disposed between reflector 52 and cover 38. Thus, reflector 52 is disposed in closer proximity to optical source 26 than cover 38, thereby substantially preventing direct exposure of cover 38 to thermal energy generated by optical source 26. Thermal energy absorbed by reflector 52 may be dissipated by convection through opening 44 and by conduction through fasteners 54. Thus, reflector 52 may be used to substantially prevent cover 38 from reaching excessively elevated temperatures.

Housing 28 may also be configured having fins 58 to provide dissipation of thermal energy generated by optical source 26. For example, fins 58 may be disposed on each side of housing 28 and coupled to internal area 48 of housing 28 to convectively dissipate thermal energy generated by optical source 26. However, other suitable methods or devices may be used to dissipate thermal energy generated by optical source 26.

Figure 3B:
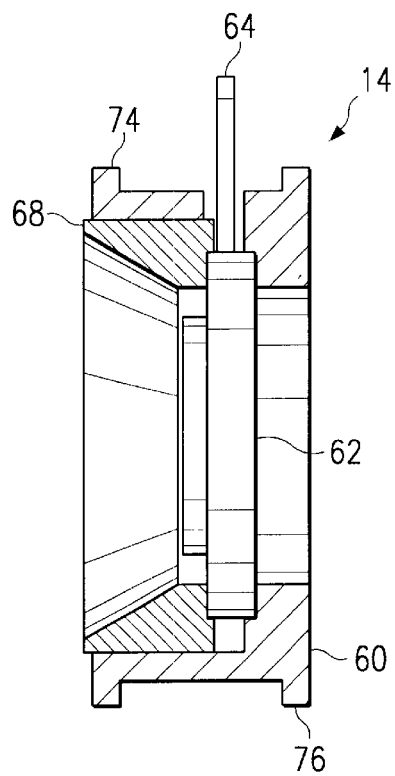
Figure 3C:
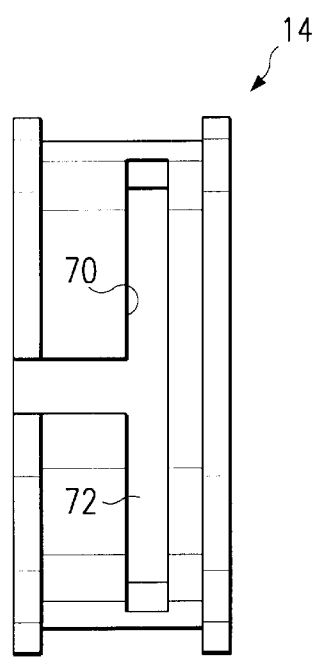

FIG. 3A is a diagram illustrating iris system 14 in accordance with an embodiment of the present invention taken along the line 3A—3A of FIG. 1, FIG. 3B is a diagram illustrating a section view of iris system 14 illustrated in FIG. 3A taken along the line 3B—3B of FIG. 3A, and FIG. 3C is a diagram illustrating a view of iris system 14 taken along the line 3C—3C of FIG. 3B. Iris system 14 comprises a housing 60 configured to receive an iris diaphragm 62 to regulate an amplitude or intensity of the optical signals generated using optical signal generator 12. For example, iris diaphragm 62 may comprise a lever 64 for adjusting a size or diameter of an aperture 66 to regulate the intensity of the optical signals transmitted from optical signal generator 12 to aperture system 16.

Iris system 14 may also comprise an iris clamp ring 68 to secure iris diaphragm 62 within housing 60. For example, housing 60 may comprise a generally T-shaped opening 70 for receiving lever 64 of iris diaphragm 62. Once lever 64 is disposed within a circumferentially disposed portion 72 of opening 70, iris clamp ring 68 may be positioned adjacent iris diaphragm 62 to secure iris diaphragm 62 within housing 60. Housing 60 may also comprise circumferentially disposed and outwardly extending flanges 74 and 76 to secure iris system 14 adjacent optical signal generator 12 and aperture system 16. For example, flange 74 of housing 60 may be disposed within recess portion 34 of optical signal generator 12, best illustrated in FIG. 2B, and fasteners 36 may be used to engage flange 74 to secure iris system 14 to optical signal generator 12, also thereby securing iris clamp ring 68 within housing 60. However, other suitable methods or devices may be used to secure iris system 14 within system 10.

Figure 4A:
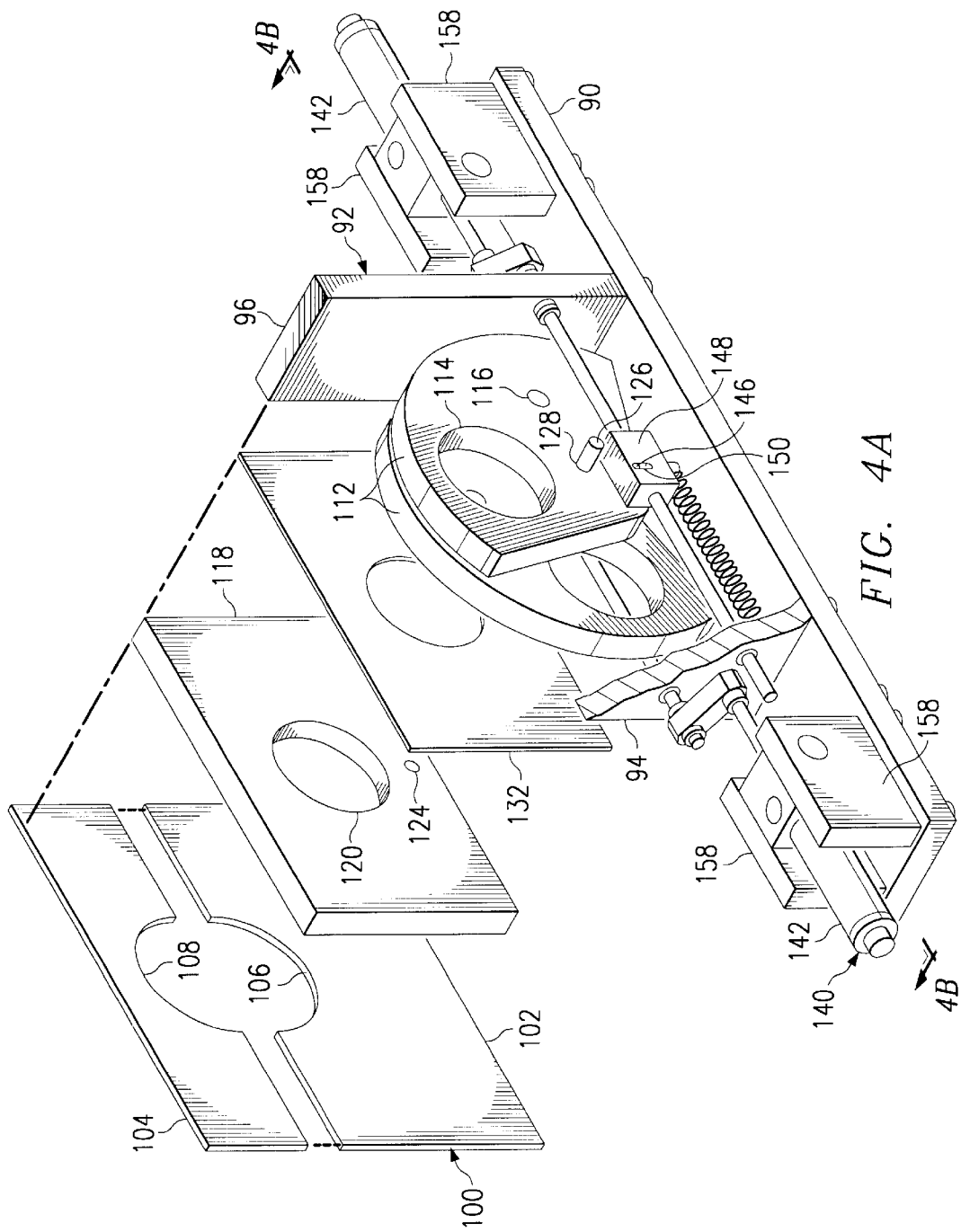

FIG. 4A is a diagram with portions broken away illustrating aperture system 16 in accordance with an embodiment of the present invention, FIG. 4B is a diagram illustrating a partial section view of aperture system 16 taken along the line 4B—4B of FIG. 4A, and FIG. 4C is a diagram illustrating aperture system 16 taken along the line 4C—4C of FIG. 4B. Aperture system 16 comprises a base 90 supporting a housing 92. Housing 92 comprises end plates 94 and 96, top plate 97, and side plates 98 and 100. Each side plate 98 and 100 comprises a lower cover 102 and an upper cover 104. Lower cover 102 comprises a hemispherically configured recess 106 to mate with a corresponding hemispherically configured recess 108 of upper cover 104 for securing other components of system 10 to aperture system 16. For example, referring to FIG. 3B, flange 76 of iris system 14 may be disposed within recesses 106 and 108 of covers 102 and 104, respectively, such that flange 76 is disposed within an interior area 110 of housing 92 and engages portions of recesses 106 and 108 disposed inwardly toward internal area 110, thereby securing iris system 14 adjacent aperture system 16. However, other suitable methods or devices may be used to secure components of system 10 to aperture system 16.

Aperture system 16 also comprises a plurality of aperture shutters 112 disposed within housing 92. Each aperture shutter 112 comprises a plurality of apertures 114 and 116 for transmitting the optical signals through aperture system 16. For example, apertures 114 and 116 may be configured and/or sized to provide a desired optical signal intensity level when aligning various apertures 114 and 116 of aperture shutters 112.

For example, as best illustrated in FIG. 4B, apertures 114 and 116 may be constructed having a generally circular configuration and aperture 114 may be sized to have a diameter greater than a diameter of aperture 116. Thus, apertures 114 of each aperture shutter 112 may be aligned to provide a maximum intensity level of the optical signals transmitted through aperture system 16. A reduced intensity level of the optical signals may be obtained by aligning aperture 114 of one aperture shutter 112 with aperture 116 of the other aperture shutter 112. Accordingly, to obtain a minimum intensity of the optical signals, apertures 116 of both aperture shutters 112 may be aligned. In this embodiment, aperture shutters 112 are illustrated having two apertures 114 and 116; however, aperture shutters 112 may comprise greater or fewer apertures to accommodate various intensity levels of optical signals.

Aperture system 16 also comprises a plurality of mounting plates 118 disposed within housing 92. Mounting plates 118 each comprise an opening 120 for transmitting optical signals through aperture system 16. Each mounting plate 118 may also comprise a recessed portion 122 having a generally circular configuration for receiving other components of system 10 coupled to aperture system 16. For example, mounting plates 118 are disposed within housing 92 such that recessed portions 122 are directed outwardly toward side plates 98 and 100. Referring to FIG. 3B, flange 76 of iris system 14 may be disposed within recess portion 122 of mounting plate 118, and lower cover 102 and upper cover 104 may be used to secure flange 76 of iris system 14 to aperture system 16. However, other suitable methods or devices may be used for securing other components of system to aperture system 16.

Mounting plates 118 also comprise an opening 124 configured for receiving a pin 126 to support rotational movement of aperture shutters 112. For example, each aperture shutter 112 may be configured having an opening 128 corresponding with opening 124 such that pin 126 may be inserted through openings 124 and 128 to support rotational movement of shutter plates 112 relative to housing 92. A spacer 130 may also be coupled to pin 126 and between adjacent aperture shutters 112 to maintain a predetermined spacing between aperture shutters 112.

As illustrated in FIGS. 4A and 4C, aperture shutters 112 are disposed between mounting plates 118 within housing 92. A wear plate 132 is attached to each mounting plate 118 and is disposed between mounting plate 118 and aperture shutter 112. Wear plate 132 may be constructed from Teflon to accommodate movement of shutter plates 112 relative to mounting plates 118 while preventing wear of shutter plates 112 and mounting plates 118. However, wear plates 132 may be constructed from other suitable materials to provide wear resistance resulting from movement of shutter plates 112 relative to mounting plates 118.

Aperture system 16 also comprises a control system 140 to control movement of shutter plates 112 for aligning apertures 114 and 116 to obtain a desired intensity of optical signals. In this embodiment, control system 140 comprises a plurality of pneumatic cylinders 142 each coupled to an aperture shutter 112. For example, each aperture shutter 112 may comprise an opening 144 configured to receive a dowel or pin 146 to provide a rotational force relative to aperture shutter 112 to cause rotation of aperture shutter 112 relative to housing 92. Control system 140 may comprise a position control block 148 having a generally elliptically configured opening 150 for cooperating with pin 146. Control system 140 may also comprise an actuator rod 152, a rod guide 154, and an adapter 156.

In the embodiment illustrated in FIGS. 4A—4C, a plurality of guide plates 158 are disposed on base plate 90 and on each side of pneumatic cylinder 142 to control a direction of translational movement of pneumatic cylinder 142. An actuating rod 160 of pneumatic cylinder 142 is coupled to adapter 156 to provide translational movement along an axis corresponding to actuator rod 152, position control block 148 and rod guide 154. An end 162 of actuator rod 152 is coupled to adaptor 156. For example, end 162 may comprise externally formed threads (not explicitly shown) such that nuts 164 may be used to threadably engage end 162 and secure actuator rod 152 to adaptor 156. An end 166 of actuator rod 152 is coupled to position control block 148. For example, end 166 may also comprise externally formed threads (not explicitly shown) for engaging an internally threaded opening (not explicitly shown) of position control block 148 such that a nut (not explicitly shown) may be used to secure end 166 of actuator rod 152 to position control block 148.

An end 170 of rod guide 154 may also include externally formed threads (not explicitly shown) for engaging an internally threaded opening (not explicitly shown) of position control block 148 to secure end 170 of rod guide 154 to position control block 148. For example, a nut 172 may be used to secure end 170 of rod guide 154 to position control block 148. Actuator rod 152 and rod guide 154 each extend through openings 174 and 176, respectively, of housing 92 to accommodate translational movement of actuator rod 152, position control block 148 and rod guide 154 relative to housing 92.

As described above, actuator rod 152 and rod guide 154 may be configured having externally formed threads such that a plurality of nuts 178 may be coupled to each actuator rod 152 and rod guide 154 to control a distance of translational movement of actuator rod 152, position control block 148, and rod guide 154 relative to housing 92. Additionally, a sleeve 180 may be disposed over each actuator rod 152 and rod guide 154 to accommodate translational movement of actuator rod 152 and rod guide 154 relative to housing 92 and prevent wear of corresponding surfaces of actuator rod 152, rod guide 154, and housing 92. Sleeve 180 may be constructed from polypropylene tubing disposed over actuator rod 152 and rod guide 154; however, sleeve 180 may also be constructed from other suitable materials to prevent wear of actuator rod 152, rod guide 154 and housing 92.

In operation, actuation of pneumatic cylinder 142 causes translational movement of actuator rod 152, position control block 148 and rod guide 154 a predetermined distance to align apertures 114 and 116 of aperture shutter 112. For example, in a non-actuated position, aperture 116 of each aperture shutter 112 may be aligned to provide a minimum intensity level of the optical signals transmitted through aperture system 16. One of pneumatic cylinders 142 may be actuated to align aperture 114 of one aperture shutter 112 with aperture 116 of the other aperture shutter 112 to transmit optical signals having a greater intensity than optical signals transmitted through aligned apertures 116. Additionally, the other pneumatic cylinder 142 may be actuated to align apertures 114 of both aperture shutters 112 to transmit a maximum intensity level of optical signals through aperture system 16. Thus, the present invention provides greater flexibility than prior systems by providing a variety of optical signal intensity levels using a single optical source.

Aperture system 16 also comprises a retraction system 190 for automatically reducing the intensity level of the optical signals transmitted through aperture system 16 in the event of a power failure or other event. For example, in the embodiment illustrated in FIG. 4B, each retraction system 190 comprises an extension spring 192 disposed between an end plate 94 or 96 and position control block 148. For example, an anchor pin 194 may be attached to end plate 94 or 96 and a spring post 196 may be attached to each position control block 148. Thus, in operation, extension spring 192 is coupled to anchor pin 194 and spring post 196 such that actuation of pneumatic cylinders 142 causes extension of extension spring 192, thereby creating an opposing retraction force in extension spring 192. Therefore, in the event of a power failure or other event, the retraction force of extension springs 192 causes retraction of pneumatic cylinders 142 to a default position such that apertures 116 of each aperture shutter 112 are aligned, thereby reducing the intensity level of the optical signals to a minimum level. However, other suitable methods or devices may be used to automatically reduce the intensity level of the optical signals to substantially prevent possible damage to the optical devices from prolonged exposure to high intensity optical signals.

Figure 5A:
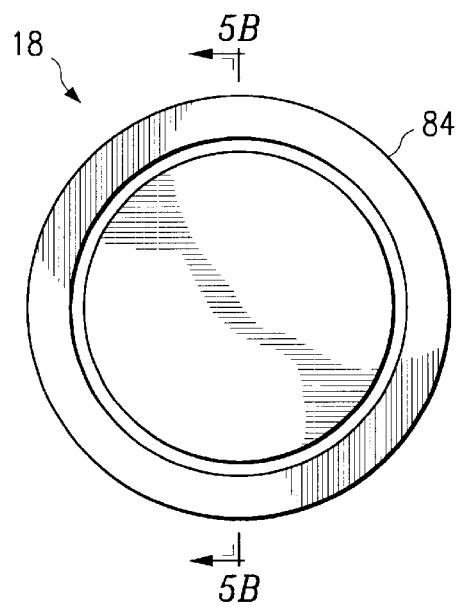
FIGS. 5A and 5B are diagrams illustrating an optical signal distributor of the system illustrated in FIG. 1 in accordance with an embodiment of the present invention.
Figure 5B:
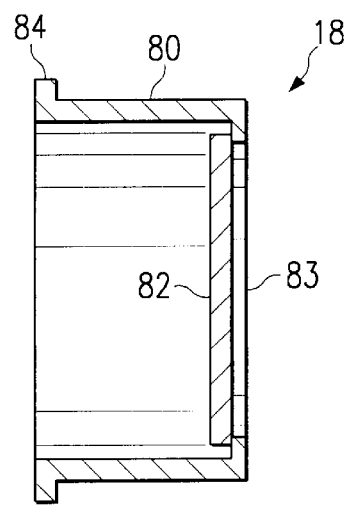

FIGS. 5A is a diagram illustrating filter system 18 in accordance with an embodiment of the present invention taken along the line 5A—5A of FIG. 1, and FIG. 5B is a diagram illustrating a section view of filter system 18 taken along the line 5B—5B of FIG. 5A. Filter system 18 comprises a housing 80 and a filter 82 disposed within housing 80. Filter 82 may comprise a diffusing plate, phase-shifting device, or other suitable types of optical signal modifiers. Filter 82 may be secured within housing 80 using an adhesive; however, other suitable methods or devices may be used to secure filter 82 within housing 80. In operation, optical signals are transmitted through filter 82 and emitted outwardly toward optical signal distributor 20 through an opening 83 of housing 80.

Housing 80 may also comprise an outwardly disposed flange 84 for securing filter system 18 adjacent other components of system 10. For example, flange 84 may be disposed within recesses 106 and 108 of lower cover 102 and upper cover 104 of aperture system 16 such that flange 84 is secured within internal area 110 of aperture system 16, thereby coupling filter system 18 to aperture system 16. However, other suitable methods or devices may be used to secure filter system 18 adjacent other components of system 10.

FIG. 6A is a diagram illustrating optical signal distributor 20 in accordance with an embodiment of the present invention taken along the line 6A—6A of FIG. 1, and FIG. 6B is a diagram illustrating a section view of optical signal distributor 20 taken along the line 6B—6B of FIG. 6A. Optical signal distributor 20 comprises a housing back plate 200 and a focus plate 202. Housing back plate 200 and focus plate 202 are constructed having a generally circular configuration; however, other suitable geometrical configurations may also be used for constructing housing back plate 200 and focus plate 202. Housing back plate 200 comprises an opening 204 for receiving the optical signals transmitted through aperture system 16.

Optical signal distributor 20 also comprises circumferentially spaced apart housing posts 206 extending between housing back plate 200 and focus plate 202. Housing posts 206 are generally disposed about the periphery of housing back plate 200 and focus plate 202 to secure focus plate 202 a predetermined distance from housing back plate 200. Housing posts 206 may be secured to housing back plate 200 and focus plate 202 using fasteners 208; however, other suitable methods or devices may be used to secure focus plate 202 at a predetermined distance from housing back plate 200.

Optical signal distributor 20 also comprises a reflector 210 disposed between housing back plate 200 and focus plate 202 to reflect the optical signals received through opening 204 to each of a plurality of openings 212 disposed in focus plate 202. For example, reflector 210 may comprise a reflector cone 211. Reflector cone 211 may be constructed from a mylar material having a light reflecting color; however, other suitable materials may be used for constructing reflector cone 211. In operation, the optical signals are received through opening 204 of housing back plate 200 and into reflector cone 211 through an opening 214 of reflector cone 211. The optical signals are reflected about the interior surface 216 of reflector cone 211 and transmitted to each opening 212 in focus plate 202.

Openings 212 in focus plate 202 are configured such that a center line 218 of each opening 212 is aligned with the vertex of reflector cone 211 such that the optical signals received into reflector cone 211 may be substantially equally distributed to each opening 212. Thus, openings 212 are aligned with the vertex of reflector cone 211 corresponding to the predetermined distance between focus plate 202 and housing back plate 200. Therefore, variations in the predetermined distance between focus plate 202 and housing back plate 200 correspondingly caused an angular alignment variation for each opening 212.

Each opening 212 is configured to receive a connector (not explicitly shown) corresponding to optical connection 22. For example, opening 212 may comprise an internally threaded portion 220 for corresponding engagement with an externally threaded portion (not explicitly shown) of optical connection 22. However, other suitable methods or devices may be used for coupling optical connections 22 to focused plate 202.

Optical signal distributor 20 also comprises a housing wrap 222 to substantially prevent extraneous optical signals from interfering with the optical signals transmitted through optical signal distributor 20. For example, housing wrap 222 may be constructed from an acetyl material having a relatively dark and/or opaque construction to substantially prevent transmission of external optical signals to an interior portion of optical signal distributor 20. However, other suitable materials or devices may be used to substantially prevent interference with the optical signals transmitted through optical signal distributor 20 from external sources. As illustrated FIG. 6B, housing wrap 222 may be disposed circumferentially about the periphery of focus plate 202 and housing back plate 200 to enclose reflector cone 211 within an interior area 224 of optical signal distributor 20. Optical signal distributor 20 may also comprise a mounting system 226 for mounting optical signal distributor 20 to support a structure.

Optical signal distributor 20 may also comprise an opening 228 disposed in focus plate 202 to provide calibration access to the optical signals transmitted through optical signal distributor 20. For example, optical signal distributor may comprise a removable focus plate plug 230 configured to releasably engage opening 228. Thus, in operation, focus plate plug 230 may be removed from opening 228 and the optical signals received by optical signal distributor 20 may be measured for intensity, frequency, and/or other optical signal properties for calibrating the optical signals. For example, the intensity of the optical signals received by optical signal distributor 20 may be measured and various components of system 10 may be manipulated, such as iris system 14 or filter system 18, in response to the optical signal measurements. Once calibrated, focus plate plug 230 may be engaged with opening 228 to prevent external optical signals from entering optical signal distributor 20.

Thus, in operation, optical signal generator 12 generates and transmits optical signals through iris system 14 and into aperture system 16. As described above, iris system 14 may be used to manipulate or modify an intensity level of the optical signals transmitted by optical signal generator 12. Aperture system 16 may be used to selectively provide various intensity levels of the optical signals received from optical signal generator 12 to transmit to optical signal distributor 20. For example, as described above, various apertures 114 and 116 of aperture shutters 112 may be aligned to selectively provide various intensity levels of the optical signals 20 optical signal distributor 20.

Filtering system 18 may be used to further modify the optical signals transmitted to optical signal distributor 20 by providing signal frequency shifting, signal diffusion, or other desired optical signal properties as required to meet various optical detector testing requirements. Optical signal distributor 20 receives the optical signals from filter system 18 and distributes the optical signals to a plurality of optical detectors via optical connections 22. As described above, optical connections 22 may comprise liquid light guides for transmitting the optical signals from optical signal distributor 20 to each optical detector coupled to an interface 24.

Therefore, the present invention provides greater flexibility and reliability than prior systems and methods by providing a variety of optical detector testing variations. For example, a single optical source 26 may be used to generate optical signals and aperture system 16 may be used to selectively transmit various intensity levels of the optical signals to a plurality of optical detectors. Additionally, in the event of a power failure or other event that may interrupt testing of the optical detectors, each optical detector tested using the present invention experiences substantially equal testing conditions. Therefore, testing of multiple optical detectors may be temporarily interrupted and restarted, thereby exposing each of the tested optical detectors to substantially uniform testing conditions.

Additionally, the present invention provides greater integrity of optical detectors than prior testing systems and methods. For example, retraction system 190 of aperture system 16 substantially prevents prolonged exposure of the tested optical detectors to high intensity optical signals in the event of a power failure or other event affecting system 10.

Although the present invention and its advantages have been described in detail, it should be understood that various changes, substitutions and alterations can be made without departing from the spirit and scope of the present invention as defined by the appended claims.

What is claimed is:

1. An optical test system for testing detectors with a same optical signal, comprising:
   a signal generator operable to generate an optical signal;
   an aperture system operable to regulate an intensity of the optical signal; and
   a signal distributor coupled to the aperture system and operable to distribute the same optical signal to a plurality of optical connections, each optical connection coupled to one of the detectors.

2. The system of claim 1, further comprising an iris system coupled to the signal generator and operable to regulate the intensity of the optical signal transmitted to the aperture system.

3. The system of claim 1, further comprising a filter system coupled to the aperture system and operable to regulate a frequency of the optical signal.

4. The system of claim 1, wherein the aperture system comprises a plurality of shutters, each shutter having a plurality of apertures operable to regulate the intensity of the optical signal.

5. The system of claim 1, wherein the aperture system comprises:
   a first shutter having a plurality of apertures;
   a second shutter having a plurality of apertures; and
   a control system operable to align one of the apertures of the first shutter with one of the apertures of the second shutter to regulate the intensity of the optical signal.

6. The system of claim 5, wherein each aperture of the first and second shutters is configured having a different diameter.

7. The system of claim 1, wherein the optical connections comprise liquid light guides.

8. The system of claim 1, wherein the signal distributor comprises:

a housing having a first end and a second end, the first end having an inlet operable to receive the optical signal, the second end having a plurality of openings coupled to the optical connections; and a reflector disposed within the housing, the reflector operable to reflect the optical signal from the inlet to each of the openings.

9. The system of claim 8, wherein each opening is aligned with the inlet.

10. The system of claim 8, wherein the reflector comprises a reflecting cone extending from the inlet to the second end of the housing.

11. A method for optically testing detectors with a same optical signal, comprising:

generating an optical signal using a signal generator;

regulating an intensity of the optical signal using an aperture system, and distributing the same optical signal to a plurality of optical connections, each optical connection coupled to one of the detectors.

12. The method of claim 11, wherein regulating comprises transmitting the optical signal through an aperture of a shutter.

13. The method of claim 11, wherein regulating comprises:

aligning an aperture of a first shutter with an aperture of a second shutter; and transmitting the optical signal through the aligned apertures.

14. The method of claim 11, wherein regulating further comprises transmitting the optical signal through an iris system, the iris system comprising an adjustable diaphragm operable to regulate the intensity of the optical signal.

15. The method of claim 11, wherein regulating comprises:

aligning a first aperture of a first shutter with a second aperture of a second shutter; and transmitting the optical signal through the first and second apertures.

16. The method of claim 15, further comprising:

aligning a third aperture of the first shutter with the second aperture of the second shutter to modify the intensity of the optical signal; and transmitting the optical signal through the second and third apertures.

17. The method of claim 11, wherein distributing comprises:

receiving the optical signal at a first end of a housing; and reflecting the optical signal to each of the optical connections coupled to a second end of the housing using a reflector disposed within the housing.

18. The method of claim 11, further comprising regulating a frequency of the optical signal using a filter.

19. A system for optically testing detectors with a same optical signal, comprising;

a signal generator operable to generate an optical signal;

an aperture system coupled to the signal generator, the aperture system having a first shutter and a second shutter, the first and second shutters each having a plurality of different size apertures;

a control system operable to align an aperture of the first shutter with an aperture of the second shutter to regulate an intensity of the optical signal, and a distributor operable to transmit the same optical signal to each of the detectors.

20. The system of claim 19, wherein the distributor comprises:

a housing having a first end and a second end, the first end configured to receive the optical signal; and a reflector disposed between the first and second ends, the reflector operable to reflect the optical signal to each of a plurality of optical connections coupled to the second end of the housing, each optical connection coupled to a detector.

21. The system of claim 20, wherein the reflector comprises a conically configured reflector.

22. The system of claim 20, wherein the housing further comprises a housing wrap extending from the first end to the second and operable to shield the optical signal from external optical interference.

23. The system of claim 19, further comprising an iris system coupled to the signal generator and operable to regulate the intensity of the optical signal transmitted to the aperture system.

24. The system of claim 23, wherein the iris system comprises an adjustable diaphragm operable to regulate the intensity of the optical signal.

25. The system of claim 19, wherein the aperture system is further operable to automatically align the apertures of the first and second shutters to transmit the optical signal having a minimum intensity in a default condition.

* * * * *

UNITED STATES PATENT AND TRADEMARK OFFICE
CERTIFICATE OF CORRECTION

PATENT NO. : 6,531,691 B1
DATED : August 20, 2002
INVENTOR(S) : James D. Pruet and Kerry A. Wilson It is certified that error appears in the above-identified patent and that said Letters Patent is hereby corrected as shown below:

<u>Title page,</u>
Item [73], Assignee, change "Northrop Grumman Corporation, Los Angeles, CA (US)" to -- Litton Systems, Inc., Woodland Hills, CA (US) --.

Signed and Sealed this

Twenty-sixth Day of August, 2003

JAMES E. ROGAN
*Director of the United States Patent and Trademark Office*